US009356297B1

(12) United States Patent
Atanassov et al.

(10) Patent No.: US 9,356,297 B1
(45) Date of Patent: May 31, 2016

(54) FACILE FABRICATION OF SCALABLE, HIERARCHICALLY STRUCTURED POLYMER-CARBON ARCHITECTURES FOR BIOELECTRODES

(71) Applicants: Plamen B Atanassov, Sante Fe, NM (US); Heather R Luckarift, Port St Joe, FL (US); Glenn R. Johnson, Panama City, FL (US); Jared N. Roy, Albuquerque, NM (US); Susan R. Sizemore, Wewahitchka, FL (US)

(72) Inventors: Plamen B Atanassov, Sante Fe, NM (US); Heather R Luckarift, Port St Joe, FL (US); Glenn R. Johnson, Panama City, FL (US); Jared N. Roy, Albuquerque, NM (US); Susan R. Sizemore, Wewahitchka, FL (US)

(73) Assignee: STC.UNM, Albuquerque, NM (US)

( * ) Notice: Subject to any disclaimer, the term of this patent is extended or adjusted under 35 U.S.C. 154(b) by 421 days.

(21) Appl. No.: 13/839,699

(22) Filed: Mar. 15, 2013

Related U.S. Application Data

(60) Provisional application No. 61/639,185, filed on Apr. 27, 2012.

(51) Int. Cl.
*H01M 4/88* (2006.01)
*H01M 8/16* (2006.01)

(52) U.S. Cl.
CPC . *H01M 4/88* (2013.01); *H01M 8/16* (2013.01)

(58) Field of Classification Search
None
See application file for complete search history.

(56) References Cited

U.S. PATENT DOCUMENTS

| 4,129,470 | A * | 12/1978 | Homsy | 156/155 |
| 7,255,874 | B1 * | 8/2007 | Bobo et al. | 424/450 |
| 2011/0217539 | A1 * | 9/2011 | Bonner et al. | 428/314.2 |
| 2011/0236769 | A1 | 9/2011 | Xie et al. | |
| 2012/0040395 | A1 * | 2/2012 | Clendennen | 435/41 |

* cited by examiner

*Primary Examiner* — Ula C Ruddock
*Assistant Examiner* — Tony Chuo
(74) *Attorney, Agent, or Firm* — Gonzales Patent Services; Ellen M. Gonzales (57) ABSTRACT

Scalable, hierarchically structure biopolymer carbon architectures that are suitable for use as bioelectrodes and biologically friendly methods for making the same.

18 Claims, 7 Drawing Sheets

FACILE FABRICATION OF SCALABLE, HIERARCHICALLY STRUCTURED POLYMER-CARBON ARCHITECTURES FOR BIOELECTRODES

CROSS-REFERENCE TO RELATED APPLICATIONS

The following application claims benefit of U.S. Provisional Application No. 61/639,185, filed Apr. 27, 2012, which is hereby incorporated by reference in its entirety.

STATEMENT REGARDING GOVERNMENT SPONSORED RESEARCH

This invention was made with Government support under Grant No. FA9550-06-1-0264 awarded by the Air Force Office of Scientific Research. The U.S. Government has certain rights in this invention.

BACKGROUND

Fuel cells are receiving increasing attention as a viable alternative energy system. In general, fuel cells convert chemical energy into electrical energy in an environmentally clean and efficient manner, typically via oxidation of hydrogen or an organic fuel in the anodic half-cell coupled to an oxygen reduction reaction (ORR) in the cathodic half-cell. Fuel cells are contemplated as power sources for everything from small electronics to cars and homes. In order to meet different energy requirements, there are a number of different types of fuel cells in existence today, each with different chemistries, requirements, and uses.

Biofuel cells are fuel cells that rely on or mimic natural biological processes to produce power. Examples of biofuel cells include enzymatic fuel cells (EFCs), which use enzymes as the electrocatalysts and microbial fuel cells (MFCs), which use microorganisms for conversion of chemical energy to electricity In a typical MFC anode, dissimilatory metal-reducing bacteria convert chemical energy to electrical energy by transferring electrons from reduced electron donors (e.g. lactate) to insoluble electron acceptors (i.e., the electrode surface). (See Logan et al., Environ. Sci Technol. 2006, 40, 5181-5192.) In nature, bacteria maximize the use of insoluble electron acceptors (usually Fe or Mn oxides) by excreting extracellular polymers that serve to bind the growing cell population into a structured biofilm. That anchored community is thus physically coupled to its electron acceptor, enhancing respiration processes. (See McLean et al., J. Microbiol. Methods 2008, 74, 47-56 and Yi et al., Biosens. Bioelectron. 2009, 24, 3498-3503.) Biofilms, however, require significant time to become established, which often leads to variable and irreproducible power density when applied to MFC design. (See e.g., Biffinger et al., Biosens. Bioelectron. 2007, 22, 1672-1679.)

Furthermore achieving efficient energy transfer from the microbial cells of a biofilm requires an electrode material that is conductive, yet biocompatible, in order to provide an interface for bacterial interactions. While numerous conductive and carbonaceous materials have been investigated to support anodic reactions in MFCs, many potential anode materials are restricted in application by limitations in scalability, cost-effectiveness, conforming dimensions, and manufacturability. Furthermore, many traditional methods for forming catalytic materials employ harsh chemical and physical conditions (such as acid etchants and heat treatments) that are inhospitable to biologicals.

Moreover, because MFCs (and EFCs) rely on the activity of live cells (or other biologically active materials), biologically-compatible methods for forming electrodes incorporating biologically active components are needed.

SUMMARY

The present disclosure provides scalable, hierarchically-structured biopolymer carbon architectures that are suitable for use as bioelectrodes and biologically friendly methods for making the same. According to an embodiment, the architecture is a biologically active scaffold comprising a three-dimensional porous matrix formed from randomized particulate materials intercalated with a biopolymer, wherein electrolytic microbes are immobilized to the surface of the scaffold. According to another embodiment, the architectures are formed by mixing a dissolvable granular material, a particulate structural material, and a shaping agent to form a mixture, shaping the mixture and allowing the mixture to harden to form a composite material, exposing the hardened composite material to a biopolymer under suitable conditions to allow the biopolymer to intercalate the particulate material in the composite material to form a polymer composite, and removing the dissolvable granular material from the polymer composite to produce a porous biopolymer scaffold.

DETAILED DESCRIPTION

According to an embodiment the present disclosure provides scalable, hierarchically structured biopolymer carbon architectures that are suitable for use as bioelectrodes and biologically friendly methods for making the same.

As stated above, in nature, bacteria excrete a wide variety of biopolymers that serve to bind the growing cell population into a structured biofilm. These biopolymers are biocompatible with a wide variety of cell types and therefore are useful for a number of applications including tissue engineering, drug delivery, biosensing, and biofuel cells. The present disclosure provides methods for forming conductive scaffolds incorporating these biopolymers. The resulting conductive scaffolds can be tailored, using the techniques described herein, to have specific structural and mechanical properties.

Figure 1:
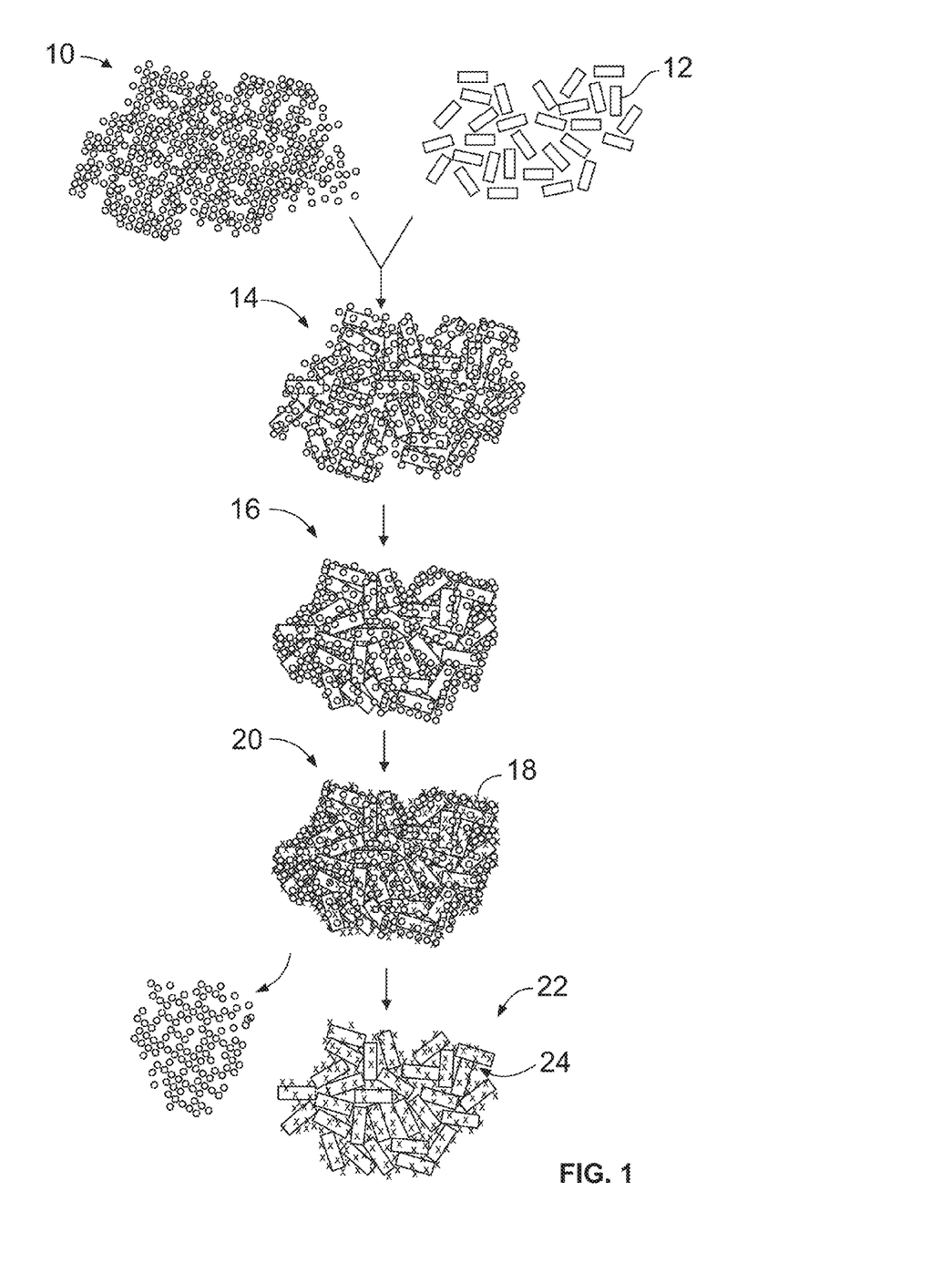
FIG. 1 is a schematic illustration of a method for forming a biopolymer-based scaffold according to a general embodiment of the present disclosure.

According to a general embodiment, the present disclosure provides a bio-friendly method of forming scaffolds incorporating biopolymers. Turning to FIG. 1, a dissolvable granular component 10 and a particulate structural component 12 are mixed together to form mixture 14. The mixture is then densely packed to form composite 16. Composite 16 is then intercalated with a biopolymer 18 to form polymer composite 20, after which the dissolvable material is removed under conditions that are not harmful to the biopolymer, resulting in porous scaffold 22, wherein the pores 24 are created by the spaces produced when the dissolvable material is removed. If desired, bacterial or other cells can then be immobilized to the scaffold, in order to produce a hierarchically structured biologically active structure.

For the purposes of the present disclosure, both the terms "granular" and "particulate" are intended to refer to conglomerations of discrete particles. For ease of discussion, the terms "granular" is used in connection with the dissolvable component and "particle" or "particulate" is used in connection with the structural components. Furthermore, for the purposes of this disclosure, the term "particle" is intended to include fibers and fiber-like structures. It will be understood from the present disclosure that the particulate matter used herein can be selected and/or tailored to produce the desired final composition and thus, depending on the intended use and desires of the user, the particles used may be nano-, micro-, or meso-scale components or any other size, limited only by the pore structure and mechanical integrity of the desired scaffold.

Examples of suitable particulate structural components include carbon-based particles such as carbon fibers (CF), reticulated vitreous carbon (RVS), carbon black (CB) particles, carbon nanotubes (CNT), graphene, and combinations thereof. Other suitable particulate structural components include metal colloids such as gold nanoparticles, quantum dots or similar particles with optical or other properties. According to some embodiments the materials that make up the particulate structural component may be monodisperse or polydisperse. Some or all of the particles may have a regular shape, including, but not limited to hollow or filled spheres, tubes, cubes, etc. Alternatively, some or all of the particulates may have an irregular shape, including, but not limited to hollow or filled spheroids, cuboids, hemi-spheres, polyhedrons, pyramids, cylinders, cones, collapsed shapes, etc. According to some embodiments, the particles in the particulate structural component may be porous.

According to some embodiments, the dissolvable granular materials are water soluble. Examples of suitable water soluble granular materials include sugar crystals such as sucrose or saccharose, inorganic salts such as sodium chloride or shape- and size-specific porogens such as gelatin, or combinations thereof. Furthermore, solvent-selective porogen materials such as paraffin spheres can be used as a scaffold material and dissolved with a suitable aliphatic solvent such as hexane.

According to some embodiments, the particles that make up the dissolvable granular material may be monodisperse or polydisperse. According to some embodiments it may be desirable to limit the size of the particles in the dissolvable granular materials to a particular size range. A sieve or other suitable means may be employed to obtain a size-specific dissolvable granular material population. According to a specific embodiment, the particles in the dissolvable granular component may have a diameter of between 350 and 600 μm.

It will be understood that because the structural component is intended to remain after the dissolvable component is removed, the structural component selected should not be soluble in the same media and under the same conditions in which the dissolvable component is soluble.

The particulate structural component and granular materials can be mixed together using suitable means including stirring, blending or agitation to obtain a desired degree of integration between the two types of particulate materials. Furthermore, it will be appreciated that the size and ratio of dissolvable to structural components can be selected to produce a desired degree of porosity in the resulting scaffold. Accordingly, the ratio of dissolvable to structural components may be between 100:1 (w/w) and 10:1, or between 50:1 and 1:1. According to some embodiments, the ratio may be 20:1, 50:1 or 100:1. According to still further embodiments the radio may be 100:3, 100:5 or 100:8. Furthermore, in some instances it may be desirable to form a structure having no particular structure or conductive component, in which case only dissolvable material might be used.

According to some specific embodiments, and as described in greater detail below, the methods of the present disclosure can be used to produce porous scaffolds having a pore size distribution in the 2-200 nm range. According to some embodiments, the methods described herein can be used to produce porous scaffolds containing a bi-modal distribution of pores containing both mesopores (2-50 nm) and macropores (>50 nm).

According to some embodiments, it may be necessary or desirable to add a shaping agent to the mixture in order to enable the mixture to form and hold a particular desired shape. For example, one or more of the dissolvable and structural components may be wetted with water or some other substance (depending upon the compatibility of the porogen) prior to or during the mixing process in order to encourage conglomeration and solidification of the mixture.

Figure 2:
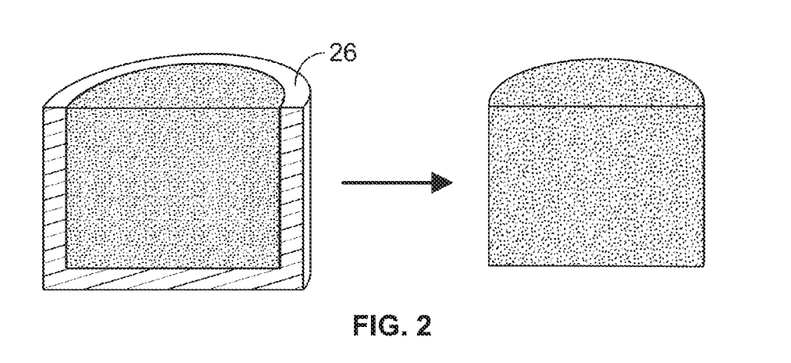
FIG. 2 is a cross-section schematic illustration showing the use of a mold to form a scaffold according to an embodiment of the present disclosure.

As stated above, the dissolvable and structural components are mixed together and then formed into a composite material. According to an embodiment, and as shown in cross-section in FIG. 2, the composite structure is formed by densely packing the mixture into or around a mold 26 and allowing the mixture to harden or solidify into a body scaffold. The mold may or may not have internal or external structures, ridges, protuberances, grooves, etc. intended to form corresponding features in the resulting scaffold. Furthermore, the mold may incorporate structural elements that enable the addition, placement, or use, additional components into, on to, around, or otherwise associated with the scaffold. According to various embodiments, the mold may be formed from any suitable material including Teflon, glass, metal, cardboard, plastic or suitable material, and may be comprised of multiple pieces that may or may not fit together. The mold may be deformable to allow for ease of removal of the hardened scaffold. The mold may be reusable, or single-use. The mold may be coated with a material that enables easy removal of the hardened scaffold and/or easy cleaning of the mold coating.

It will be understood that while the composite described herein may be referred to herein as a dense structure, so as to differentiate it from a structure formed from loosely packed particulate matter, the internal structure of the composite is still accessible to the polymeric material such that the polymeric material is able to intercalate between the various particles that form the composite.

According to another embodiment the composite could be formed by pressing, rolling, or painting the mixture onto a surface. In this case, the resulting composite structure may be more planar in nature, resembling a thick or thin film or coating rather than the three dimensional structure shown in FIG. 2. Moreover, the surface may or may not have structural modifications intended to produce corresponding structural features in the resulting scaffold.

According to a further embodiment, the mold or surface may act as a permanent support for the resulting scaffold, wherein the scaffold is not ultimately removed from the support. For example, in some embodiments, as in water reclamation projects, it may be desirable to coat a surface, such as a sewage treatment container with a biocatalytic material, resulting in a partially or completely self-powering sewage treatment facility. It will be appreciated that the techniques and material described herein would be suitable for such a use.

The hardened composite is then removed from the mold or surface, or not, as desired, and the composite is exposed to a suitable biopolymer in a manner sufficient to allow the biopolymer to intercalate the particulate components of the composite. Examples of suitable biopolymers include Poly (3-hydrobutyate-co-3-hydroxyvalerate) (PHBV) with varying co-polymer ratios of polyhydroxyvalerate, poly(3-hydroxybutyrate) or any of the class of polyhydroxyalkanoates or similar polymer materials. The biopolymer can be obtained commercially or synthesized by reported literature methods for growth of microbial strains such as *Ralstonia eutrophus* or *Bacillus megaterium* and the harvest of bioplastics during bacterial growth.

The dissolvable material may be removed using any suitable means. For example, if the dissolvable material is water soluble, the hardened composite (and any associated support or mold, if desired) may be placed in or otherwise exposed to an aqueous environment for a suitable amount of time.

Bacterial or other cells can then be immobilized to the scaffolding using any suitable method. According to a first exemplary method, cultured microbial cells can be immobilized to the scaffold using a silica-encapsulation method similar to that described in Luckarift et al., Chem. Commun. (Cambridge, U.K.) 2010, 46, 6048-6050. Briefly, the scaffold is placed in the central well of a glass container including both a central well and an outer well. A cell suspension containing the cells to be immobilized to the scaffolding is added to cover the scaffold and a silica precursor such as tetramethylorthosilicate (TMOS) is added to the outer well. TMOS in vapor phase undergoes rapid hydrolysis in contact with aqueous solvents of high salt concentration and leads to rapid formation of particulate silica. The resulting matrix of silica particles immobilizes the bacterial cells directly on the surface of the scaffold.

Additional methods of immobilizing cells to the scaffolds include crosslinking, lyophilization, freeze-drying and methods for whole cell encapsulation such as entrapment in gelatin or agarose.

Various dissimilatory metal-reducing bacteria (or so-called exoelectrogens) are suitable microbes to be immobilized on the scaffolds described herein for application in MFC. Specific examples include, but are not limited to: *Shewanella* spp., *Geobacter* spp., *Rhodopseudomonas* spp., *Ochrobactrum* spp., *Enterobacter* spp., *Thiobacillus thiooxidans*, *Thiobacillus ferrooxidans*, *Acidiphilium cryptum*, *Acidiphilium multivorum*, *Acidiphilium symbioticum*, *Acidiphilium angustum*, *Acidocella aminolytica*, *Acidocella facilis*, *Sulfobacillus the rmosulfidooxidans*, *Ferro plasmaacidarmanus*, *Metallosphaera sedula*, *Sulfolobus acidocaldarius*, *Sulfolobus solfataricus*, *Acidithiobacillus thiooxidans*, *Leptospirillum ferrooxidans*, *Escherichia coli*, *Shewanella oneidensis* and *Acidithiobacillus ferrooxidans*, *Pseudomonas* spp., *Burkholderia* spp. and others.

It will be appreciated that the scaffolds described herein can be augmented with other materials to provide interfaces for various catalysts and other biological or chemical interactions. For example, the scaffolds described herein could be augmented with redox enzymes for anodic and cathodic reactions. Examples of redox enzymes include multicopper oxidases (laccase, bilirubin oxidase, ascorbate oxidase etc.), dehydrogenases (e.g glucose, pyruvate, lactate, glycerol) for oxidation of sugars, co-factor dependent redox enzymes such as glucose oxidase, PQQ-dependent glucose dehydrogenase, etc. These enzymes could be incorporated into the scaffolds described above by standard methods of enzyme immobilization, as described for example by Betancor and Luckarift, Trends in Biotechnology, 2008, 26 (10): 566-572).

As a specific example of a biocompatible method for producing a bioelectrode, conductive carbon fibers are mixed with wet sucrose and the resulting mixture pressed into a cylindrical mold and allowed to dry. A solution containing a desired biopolymer (in compatible solvent) is then applied to the sucrose/carbon fiber template and the solution allowed to incorporate into the template. The three-dimensional scaffold forms as the solvent evaporates and the polymer dries. The template is then exposed to suitable conditions to remove the sucrose, for example by immersion in water, forming a porous three-dimensional structure comprising a carbon fiber matrix intercalated with the biopolymer. Electrogenic microbes are then immobilized to the biopolymer/carbon fiber scaffold.

It will be appreciated that additional materials may be incorporated into the scaffold. For example, if the scaffold is to have conductive properties, for instance, in order to act as an electrode, the particulate structural component and granular dissolvable material may be packed around or otherwise incorporate one or more additional conductive materials or structures. Furthermore, the particulate structural component may itself have physical, chemical, and/or electrical properties that enhance the final desired product.

Figure 3:
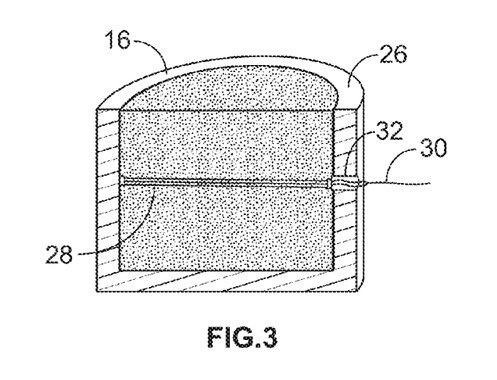
FIG. 3 is a cross-section schematic illustration showing the incorporation of an additional structure in a scaffold according to an embodiment of the present disclosure.

According to a specific example of this embodiment, the carbon fiber/wet sucrose mixture described above may be packed around a steel mesh or other material, including but not limited to titanium gauze (20-40 mesh), titanium mesh or carbon yarn and textiles. Turning to FIG. 3, a cross section of a composite structure 16 is shown within mold 26. The composite structure has been packed around a mesh disk 28 from which wire 30 extends. Mold 32 is also shown to include an opening 30, through which wire 30 may extend. In this embodiment, the current conductor remains within the fully formed scaffold and may act, for example, as an additional structure agent and/or as a current conductor and/or as some other component to be used within the electrode. Because the manufacturing conditions described herein are mild compared to many other conditions used to produce electrodes and fuel cell components, any number of components may be incorporated into the scaffolds, structures, and electrodes described herein.

Furthermore, it will be appreciated that the present disclosure provides a mechanism for specifically tailoring the shape, size, and porosity of the resulting scaffolds. Moreover, because the degree of porosity can be controlled, the methods of the present disclosure can be used to produce a porous scaffold with a predetermined specific surface area. According to some embodiments, the scaffolds have a specific surface area of between 4.7 and 4.4 $m^2/g$.

The degree of conductivity of the resulting scaffold can be controlled by varying the ratio of conductive additive in relation to the polymer scaffold. A specific example of how these ratios work is for one exemplary set of scaffolds is detailed in Table 2.

| Graphite fiber mass (g) | Measured compressed resistance (Ω) | Material compressed resistance (Ω) | Mass of sample (mg) | Ω/g |
| --- | --- | --- | --- | --- |
| 0.03 | 27 | 26.94 | 24.5 | 1099.59 |
| 0.06 | 10.6 | 10.54 | 26 | 405.38 |
| 0.08 | 0.65 | 0.59 | 25 | 23.60 |
| 0.1 | 0.33 | 0.27 | 28 | 9.64 |
| 0.15 | 0.29 | 0.23 | 27 | 8.52 |
| 0.2 | 0.28 | 0.22 | 28 | 7.86 |

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims.

Under no circumstances may the patent be interpreted to be limited to the specific examples or embodiments or methods specifically disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

Example I

Preparation of Scaffolding Material for Use with the Model Anode Respiring Organism *Shewanella oneidensis* DSP-10

Chemicals. Poly(3-hydrobutyate-co-3-hydroxyvalerate) (PHBV) with 12% poly(hydroxyvalerate) content, and graphitized carbon nanofibers (CF; hollow fibers 80-200 mm o.d., 0.5-10 nm i.d., length 0.5-20 μm) were purchased from Sigma-Aldrich (St. Louis, Mo.). Sucrose was purchased as a general grocery item as common household sugar and sieved to a defined size using 30-60 mesh screen sieves (0.250-0.595 mm particle size).

Preparation of PHBV/CF Scaffolds.

Wet sucrose was mixed with CF (100:1 w/w), hand-pressed into cylindrical pre-fabricated molds (1.3×0.9 cm; volume=1.195 $cm^3$) and dried overnight at 37° C. All sucrose/CF mixtures were pressed around a circle of nickel screen (40 mesh, Alfa Aeser, Ward Hill, Mass.) to act as a current collector that was connected externally via a length of titanium wire (0.25 mm diameter, Goodfellow, Oakdale, Pa.). PHBV was dissolved in chloroform (0.04% w/v), heated to 60° C. and applied to the sucrose/CF template until all of the PHBV solution was incorporated. After overnight drying at 25° C., the resulting polymer composite (PHBV/CF) was immersed in deionized water (0.3 L) for 2 hours to dissolve the sucrose. The resulting composite electrodes are designated as $PHBV_{30}$/CF and $PHBV_{45}$/CF for PHBV/CF composites formed with 30 and 45 mesh size sucrose, respectively.

Growth and Immobilization of *Shewanella oneidensis* DSP-10.

*S. oneidensis* DSP-10 was cultured in Luria Bertani broth containing rifampicin (5 μg mL-1) at 30 oC, 150 rpm. Cell counts were determined by conventional serial dilution, plating and counts of colony forming units per mL (cfu mL-1). Cells were harvested at late stationary phase (OD600~4-5), washed (×3) and resuspended in phosphate buffered saline (8 g L-1 NaCl, 0.2 g L-1 KCl, 1.44 g L-1 $Na_2HPO_4$, 0.24 g L-1 $KH_2PO_4$, pH 7.4) to a defined cell density (1×109 cfu mL-1). DSP-10 was immobilized to the PHBV/CF composite electrodes using a method for silica-encapsulation described in Luckarift, H. R.; Sizemore, S. R.; Roy, J.; Lau, C.; Gupta, G.; Atanassov, P.; Johnson, G. R. Chem. Commun. (Cambridge, U.K.) 2010, 46, 6048-6050, incorporated by reference above.

Briefly, PHBV/CF electrodes were placed in a glass Petri dish (4.5 cm diameter) modified with a central glass well (1.7 cm diameter) to accommodate the electrode. The cell suspension (1 mL) was added to cover the PHBV/CF electrode and tetramethylorthosilicate (TMOS; 0.2 mL) was added to the outer well. TMOS in vapor phase undergoes rapid hydrolysis in contact with aqueous solvents of high salt concentration and leads to rapid formation of particulate silica. The resulting matrix of silica particles immobilizes the bacterial cells directly on the PHBV/CF surface. For control experiments, PHBV/CF electrodes were incubated with a suspension of DSP-10 as prepared above, but in the absence of TMOS. Cell viability and loading on PHBV/CF electrodes was determined using a microbial cell viability assay based on relative luminescence units (RLU) for direct quantification of ATP according to the manufacturer's instructions (BacTitre-Glo® Reagent, Promega, Madison, Wis.).

Electrochemical Measurements.

Electrochemical measurements were made in a one-compartment electrochemical cell containing 30 mL electrolyte (potassium phosphate buffer/KCl, 0.1 M, pH 7.0) with lactate (20 mM) as electron donor (fuel), unless otherwise stated. The experimental cell was assembled from a European 5-neck flask (50 mL) that had three 14/20 slip-fit and two #7 threaded ports for electrodes, gas, and exchange ports (Ace Glass, Vineland, N.J.). The electrolyte was purged continuously with nitrogen to displace any dissolved oxygen. Measurements consisted of the PHBV/CF anode as working electrode, a glassy-carbon counter electrode (Metrohm USA, Riverview, Fla.) and a standard Ag/AgCl reference electrode (CH Instruments Inc., Austin, Tex.). All electrochemical measurements done with electrolyte at 24-26° C. Cyclic voltammetry and polarization studies were controlled using a potentiostat (Versastat 3; Princeton Applied Research, Oak Ridge, Tenn.). Power densities were calculated using Ohms law and values normalized to the geometric volume (1.195 cm3). The internal resistance of the anodes was calculated from the slope of the linear region of the polarization curve (−0.3 to −0.2 V).

Porosity and Contact Angle Measurements.

Pore size distribution and surface area was determined using a surface area analyzer (Quantachrome Autosorb-1 analyzer) based on $N_2$ sorption isotherms. Contact angle measurements were obtained using the sessile drop method with a drop shape analyser according to the manufacturer's instructions (DSA100 Krüss, Mathews, N.C.).

Imaging, Sample Preparation and Microscopy.

Scanning electron microscopy (SEM) was used to visualize the interior and exterior features of the composite materials. PHBV/CF anodes with bacteria were fixed with 2.5% glutaraldehyde in cacodylic buffer (0.1M), and then dehydrated in and fixed using ethanol as solvent and critical point drying methods according to the manufacturer's instructions (Autosamdri®-815, Tousimis Research Corp. Rockville, Md.). Non-conductive samples were sputter-coated with gold (Denton Desk-V, Denton vacuum LLC, Moorestown, N.J.). All samples were examined using a model 2600-N scanning electron microscope (Hitachi HTA, Pleasanton, Calif.).

Results and Discussion

Fabrication of 3D Hierarchically Structured Polymer/Carbon Bioelectrodes

Figure 4:
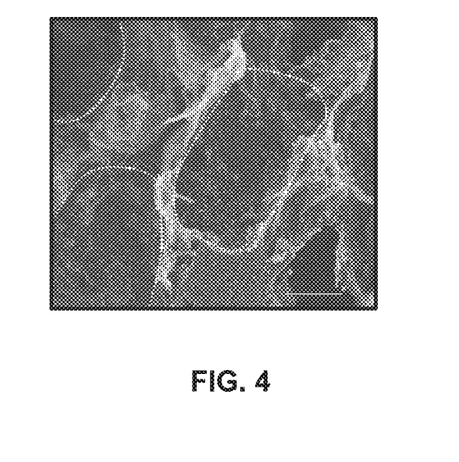
FIG. 4 is a close-up view of a poly(3-hydroxybutyrate-co-3-hydroxyvalerate) (PHBV)/carbon fiber (CF) scaffold formed using the methods as described herein, clearly showing the pores left of the removal of sucrose from the polymer composite.
Figure 5:
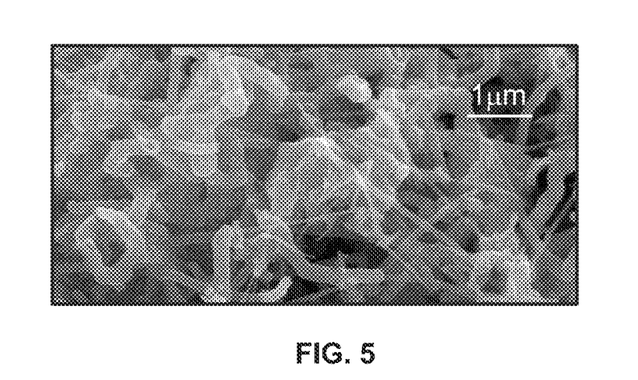
FIG. 5 is a scaled back view of the PHBV/CF scaffold showing the porous material formed from the interconnected carbon fibers.
Figure 6:
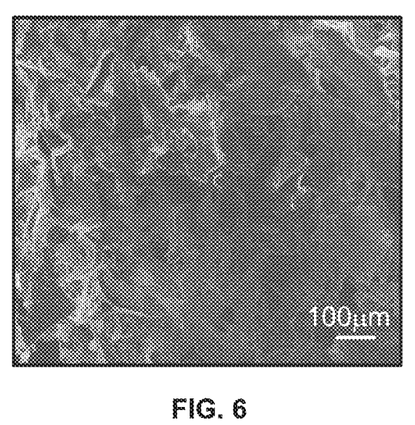
FIG. 6 is an SEM micrograph of a cross-section of $PHBV_{30}$ without carbon fiber.
Figure 7:
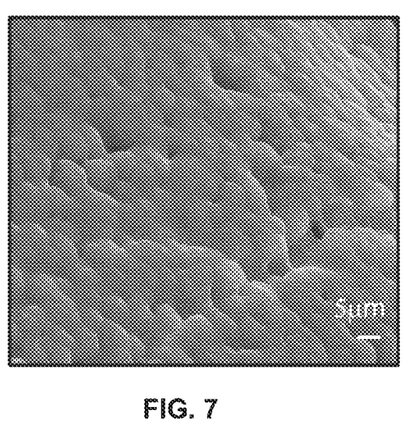
FIG. 7 is an SEM micrograph of a cross-section of $PHBV_{30}$ without carbon fiber at a higher magnification than FIG. 6.
Figure 8:
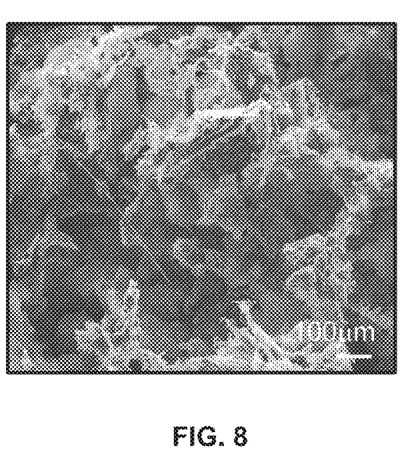
FIG. 8 is an SEM micrograph of a cross-section of $PHBV_{30}$ with carbon fiber.
Figure 9:
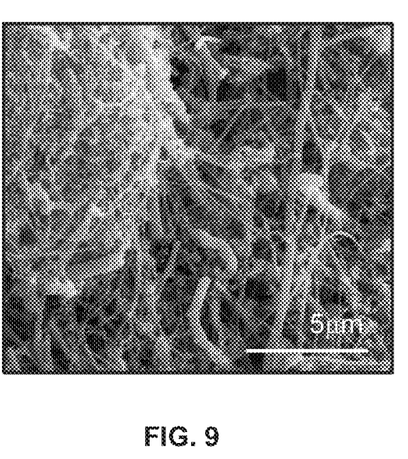
FIG. 9 is an SEM micrograph of a cross-section of $PHBV_{30}$ with carbon fiber at a higher magnification than FIG. 8.
Figure 10:
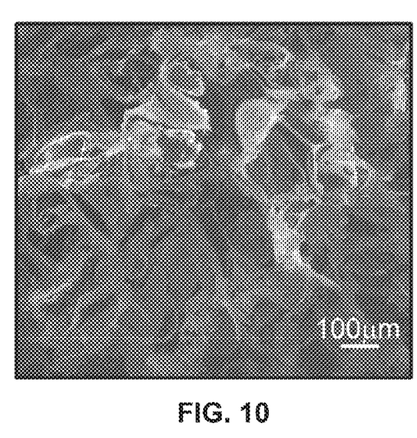
FIG. 10 is an SEM micrograph of a cross-section of $PHBV_{45}$ without carbon fiber.
Figure 11:
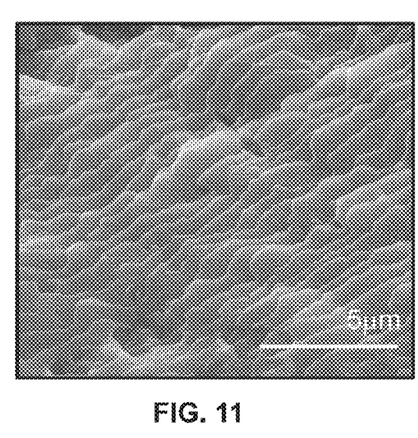
FIG. 11 is an SEM micrograph of a cross-section of $PHBV_{45}$ without carbon fiber at a higher magnification than FIG. 10.
Figure 12:
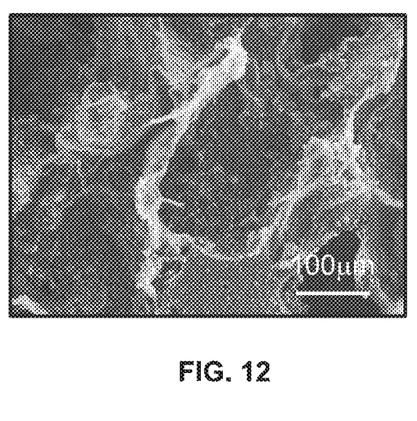
FIG. 12 is an SEM micrograph of a cross-section of $PHBV_{45}$ with carbon fiber.
Figure 13:
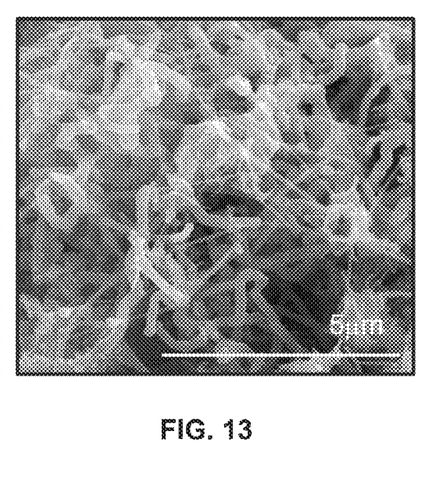
FIG. 13 is an SEM micrograph of a cross-section of $PHBV_{45}$ with carbon fiber at a higher magnification than FIG. 12.

The composition of the sucrose-based porogen influenced electrode architecture significantly. The crystalline sucrose sieved using 30 mesh (<595 μm) and 45 mesh (<354 μm) were found to optimize material fabrication and structure. Increasing the sucrose mesh size resulted in packed template scaffolds that were too dense for the polymer to penetrate. In contrast, decreasing the mesh size of the sucrose (or using sucrose that was not sieved) resulted in a polymer matrix that was poorly interconnected and therefore mechanically brittle. The crystal size of the sucrose defined the porosity within the final structure and dictated the formation of a primarily macroporous/mesoporous internal structure (see FIGS. 4 and 5 and Table 1). For MFC applications, an open porous structure is desirable to ensure unrestricted access of nutrients (fuel) through convective flow and diffusion, combined with large surface area of the porous matrix to encourage interaction between bacterial cells and the anode interface.

TABLE 1

Materials characterization of PHBV/CF composites

| | Unprocessed carbon nanofibers | 30 mesh | 45 mesh |
|---|---|---|---|
| [1]BET ($m^2/g$) | [4]ND | 4.69 | 4.41 |
| [2]Micro pore surface area ($m^2/g$) | ND | 2.906 | 0.102 |
| Conductivity ($\Omega/g$) | 20.4 | 51.2 | 36.8 |
| [3]EASA ($cm^2/g$) | ND | 697 | 454 |
| Contact Angle (°) | ~86.7 | ~0 | ~0 |
| Density ($g/cm^3$) | ND | 0.14 | 0.15 |

[1]BET specific surface area,
[2]micro pores < 2 nm,
[3]EASA: Electrochemically accessible surface area,
[4]ND: not determined In addition, the PHBV/CF composites formed directly around a current collector, thereby providing an electrode that can be fabricated without the need for any further supporting material. The resulting PHBV/CF composite material provide a light-weight structure with a hierarchical porosity as observed in SEM images (FIGS. 6-13). The presence of CF within the microstructure of the PHBV composites is evident from SEM images when compared to PHBV polymer prepared in the absence of CF. By initially mixing the CF with the sucrose, the conductive carbon becomes an integral part of the porogen scaffold and creates a homogenous distribution of carbon throughout the final matrix. The addition of CF also adds a surface roughness to the polymer matrix that increases the surface area (Table 1) and may enhance bacterial adhesion. In addition to SEM, the Barett-Joyner-Halenda method of isotherm analysis was used to characterize the pore size distribution and both PHBV/CF samples were found to have pores in the meso (2-50 nm) and macro (>50 nm) pore range. PHBV/$CF_{45}$ exhibits a well defined pore size distribution with a maximum distribution at 2-3 nm. PHBV/$CF_{30}$ showed less defined pore size distribution over the entire range (2 nm to 200 nm) with slight domination of 2-3 nm and 20 nm pores. The Brunauer-Emmett-Teller (BET) method of isotherm analysis was used to determine the specific surface area and confirmed that PHBV/$CF_{30}$ and PHBV/$CF_{45}$ have overall comparable specific surface areas of 4.69 and 4.41 $m^2/g$, respectively, despite inherent differences in pore size distribution (Table 1).

The homogeneous distribution of CF throughout the polymer matrix also renders the matrix conductive (Table 1). Bulk and powder resistivity were determined by compressing the materials while measuring the change in resistance and PHBV/$CF_{30}$ and PHBV/$CF_{45}$ demonstrate a final powder resistivity of 51.2 $\Omega/g$ and 36.8 $\Omega/g$ respectively, compared to an equal mass of pre-treated CF (20.4 $\Omega/g$). Using the larger mesh sucrose (PHBV/$CF_{45}$) during fabrication of the composites decreased the amount of non-conductive filler and thereby resulted in a lower resistivity, comparable to plain CF (Table 1). The more defined pore size distribution and the lower resistivity made the PHBV/CF$_{45}$ the material of choice for this study. While the fabrication of the PHBV/CF composites slightly alters the bulk conductivity of the conductive matrix, the conductivity of the composites is comparable to plain CF. Any reduction in bulk conductivity can be attributed to the meso/macroporosity character of the composite material (Table 1).

Static contact angle measurements of the composites confirmed the hydrophobic nature of the unmodified polymer (contact angle of 106.2±8.7 and 101.1±13.4 for PHBV$_{30}$ and PHBV$_{45}$ mesh respectively, n=6) in agreement with previous reports. (See, e.g., Misra, S. K.; Mohn, D.; Brunner, T. J.; Stark, W. J.; Philip, S. E.; Roy, I.; Salih, V.; Knowles, J. C.; Boccaccini, A. R. Biomaterials, 2008, 29, 1750-1761.) The wetability of the composites increased significantly when CF were included in the structure and decreased the contact angle to essentially zero (Table 1). The additional effective roughness of the CF within the polymer matrix may add to the increased hydrophilicity of the matrix. A similar observation was previously noted for the inclusion of bioactive glass was added to PHB composites. (See again, Misra, S. K.; Mohn, D.; Brunner, T. J.; Stark, W. J.; Philip, S. E.; Roy, I.; Salih, V.; Knowles, J. C.; Boccaccini, A. R. Biomaterials, 2008, 29, 1750-1761.)

Figure 14:
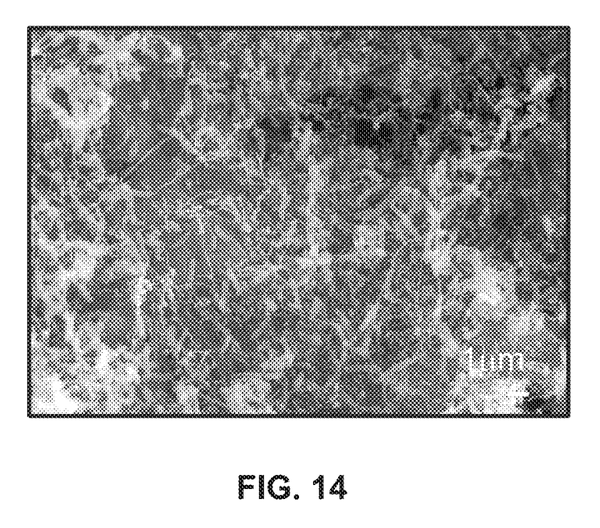
FIG. 14 is an SEM micrograph of *Shewanella oneidensis* DSP-10 immobilized to PHBV/CF scaffolds.
Figure 15:
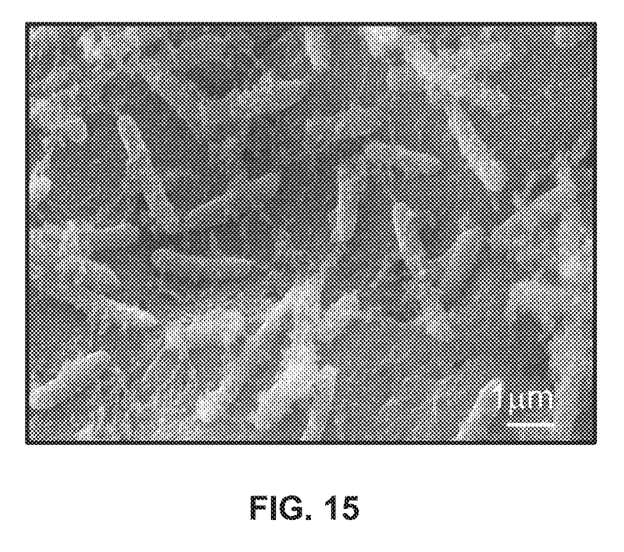
FIG. 15 is an SEM micrograph of *Shewanella oneidensis* DSP-10 immobilized to PHBV/CF scaffolds at a higher magnification than FIG. 14.

Characterization of Hierarchically-Structured PHBV/CF Electrodes as Anodes for MFC Initial characterization of the PHBV/CF electrode materials revealed material properties that would be advantageous for MFC applications. In order to confirm utility, MFC anodes were prepared by immobilizing S. oneidensis DSP-10 to the surface of PHBV/CF via silica encapsulation. (See e.g., Luckarift, H. R.; Sizemore, S. R.; Roy, J.; Lau, C.; Gupta, G.; Atanassov, P.; Johnson, G. R. Chem. Commun. (Cambridge, U.K.) 2010, 46, 6048-6050, incorporated by reference, above.) The stabilized open circuit potentials (OCP) of the bacterial anode half-cells were comparable irrespective of sucrose mesh size; −322±18 and −328±16 mV (vs Ag/AgCl) (n=4) for PHBV$_{30}$/CF and PHBV$_{45}$/CF respectively (lactate as the electron donor). OCP values were highly reproducible across replicate electrodes, even when fabricated using different bacterial cultures prepared days or weeks apart. Control anodes in the absence of cells exhibit no electrocatalytic activity besides Faradaic capacitance and OCP of ~150 mV (vs Ag/AgCl) (data not shown). The high reproducibility of the MFC anodes prepared in this manner is attributed to the porous encapsulation matrix, which serves to create an engineered biofilm of a defined cell density in a specific metabolic state. The short time required to achieve a stable and reproducible MFC anode is advantageous and significantly reduces the time delay (often several days) typically required to establish a natural biofilm and achieve maximum cell potential. The physical entrainment of bacterial cells at the anode surface could be visualized and verified by SEM and indicated homogenous distribution when analyzed at various cross-sections throughout the matrix (FIGS. 14-15). As SEM imaging is only qualitative, quantitative enumeration of viable microbial cells on the anode was further determined by using ATP as an indicator of metabolically active cells. Cell counts of 2.4×10$^7$±1.2×10$^7$ and 6.8×10$^7$±2.1×10$^7$ cfu mg$^{-1}$ polymer were determined for PHBV$_{30}$/CF and PHBV$_{45}$/CF composites respectively and confirmed high cell loading on the composite material. Control PHBV/CF electrodes incubated with DSP-10 to allow the formation of a natural biofilm on the electrode surface confirmed that the electrocatalytic characteristics of DSP-10 are reflective of native electron transfer processes and not artifacts of the immobilization procedure (data not shown).

Figure 16:
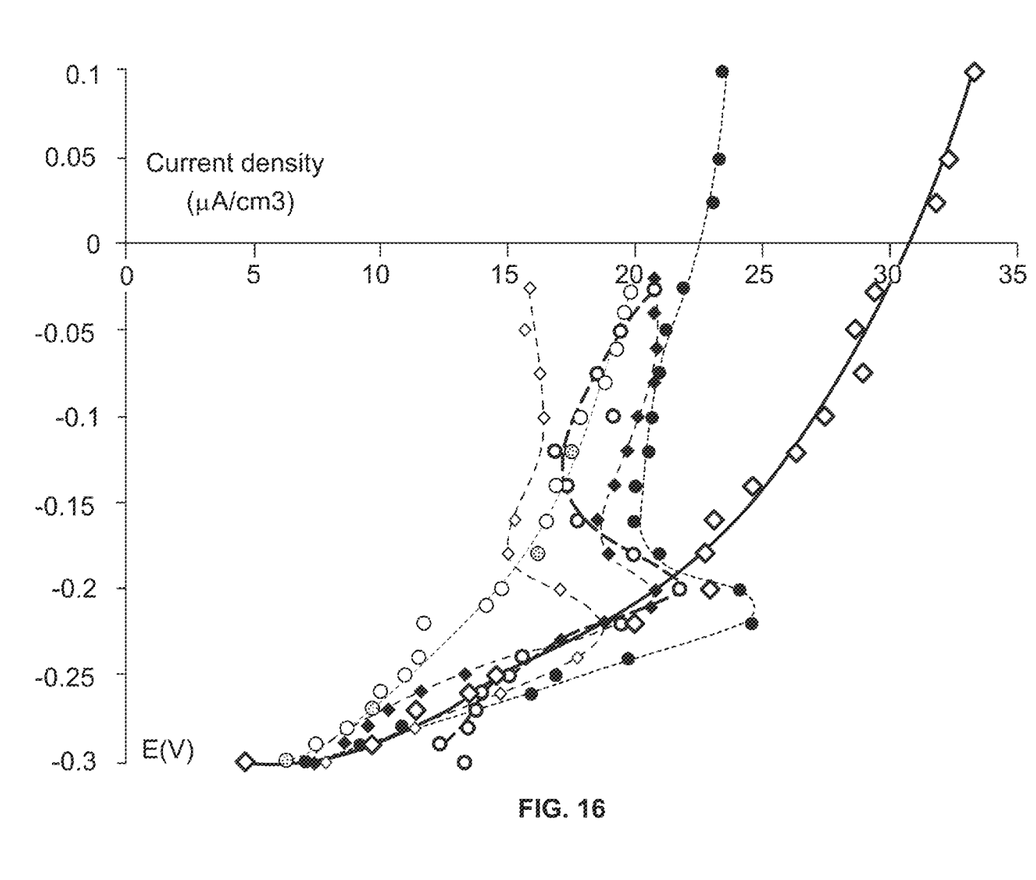
FIG. 16 is a graph showing the polarization curves for $PHBV_{30}/CF$ (circles) and $PHBV_{45}/CF$ (diamonds) with immobilized DSP-10.
Figure 17:
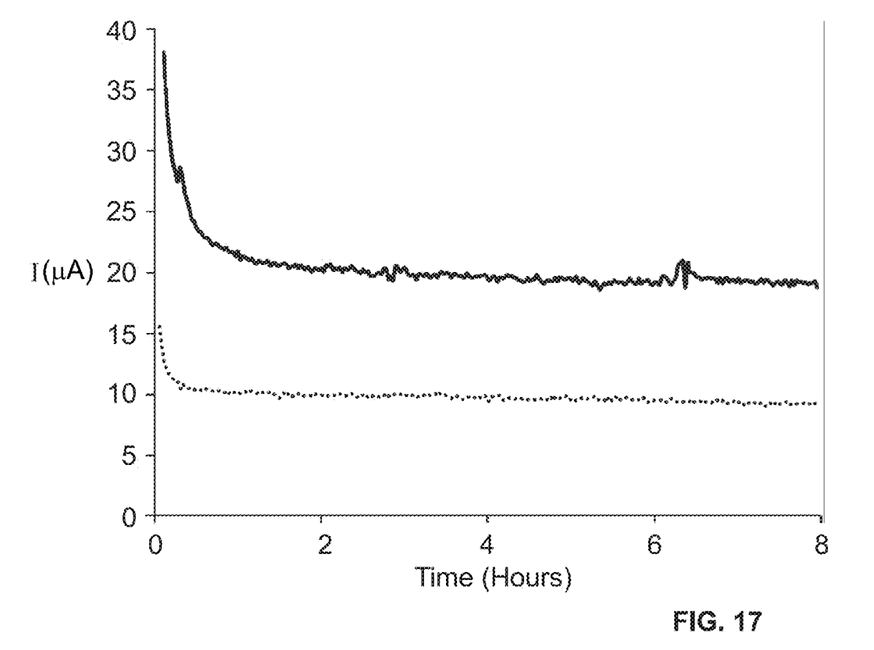
FIG. 17 is a graph showing chronoamperometry of $PHBV_{30}/CF$ (dashed lines) and $PHBV_{45}/CF$ (solid line) at −0.15 V vs Ag/AgCl.

The maximum current density of the DSP-10 functionalized PHBV/CF anodes was comparable irrespective of the template mesh size (22.02±2.37 and 22.18±6.69 µA/cm$^3$ [n=3], for PHB$_{30}$/CF and PHBV$_{45}$/CF respectively) and exhibited maximum power densities approaching 5 µW/cm$^3$ (4.23±1.22 and 4.38±0.18 µW/cm$^3$ [n=3] for PHBV$_{30}$/CF and PHBV$_{45}$/CF mesh respectively) during polarization measurements (FIG. 16). This is in agreement with the hypothesis that the pore-forming/templating ensures the macropore structure and the biological catalyst immobilization capacity is determined by the meso-porosity obtained from the CF component of the polymer/carbon composite matrix. The internal resistance of the anodes was calculated to be approximately ~10 Ωcm (n=3) for both PHBV$_{45}$/CF and PHBV$_{30}$/CF.[26] Under potentiostatic conditions (−0.15V vs Ag/AgCl), PHBV$_{30}$/CF and PHBV$_{45}$/CF anodes maintain a stable current for 8 hours with no loss in efficiency and confirm the stabilization of the bacterial population at the anode surface (FIG. 17). Current density reaches a maximum that is sustained between −0.2 and 0 V and any further increase in current output is limited by mass transport effects. The observed drop in limiting current density after an apparent maximum can be explained by local starvation of the electrodes by a lack of local fuel. This is dictated by distribution of bacteria within the porous body.

Example 2

Preparation of Scaffolding Material for Enzymatic Polymer-Carbon Cathode

Chemicals.

Sieved sucrose (6 grams, 500 µm) was mixed with graphite nanofibers (50:1% w/w) and wet with DI water to moisten the material.

Preparation of PHBV/CF Scaffolds.

Figure 18:
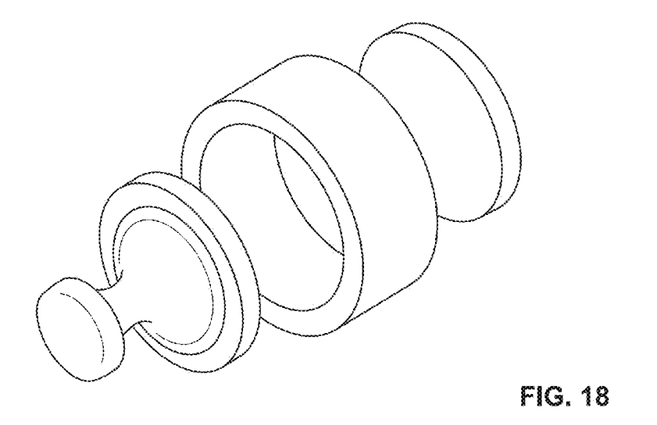
FIG. 18 depicts a mold that is suitable for producing scaffolds as described herein.

The mixture was hand-pressed in a round mold (FIG. 18) (1.938" diameter: see figure X) around a circle of titanium mesh (1" diameter, 20 mesh attached to a length of titanium wire) as current collector and dried overnight at 37° C. PHBV polymer (1.12 g) was dissolved in chloroform (17.5 mL) at 60° C. and applied drop-wise until all polymer was forced into the scaffold. After drying overnight at 25° C., the polymer structure was immersed in DI water (3-4 changes of ~1 L over a period of 8 hours) to dissolve out the sucrose. This gave a polymer-carbon architecture of ~5 cm×3 mm (5.8 cm3) that was used as a cathode electrode. The electrode was functionalized with bilirubin oxidase using a procedure for enzyme immobilization described in Ramasamy, R. P., Luckarift, H. R., Ivnitski, D. M., Atanassov, P. B., Johnson, G. R. Chem. Commun. (Cambridge, U.K.) 2010, 46, 6045-6047, incorporated by reference above.

Characterization of PHBV/CF Bilirubin Oxidase Cathodes

In the presence of oxygen, bilirubin oxidase-functionalized cathodes shows a steady open-circuit potential of ~0.5 V (versus Ag/AgCl) which is close to the theoretical redox potential of the copper centers in the protein. The presented design of a cathode electrode with tethered bilirubin oxidase as biocatalyst for oxygen reduction delivers a maximum current density of ~0.1 mA cm3.

Example 3

Preparation of Scaffolding Material for a Large Rectangular Enzymatic Polymer-Carbon Anode Chemicals.

Sieved sucrose (18 grams, 500 μm) was mixed with graphite nanofibers (20:1% w/w) and wet with DI water to moisten the material.

Preparation of PHBV/CF Scaffolds.

The mixture was hand-pressed in a rectangular mold (2.0× 1.688") around a mesh of carbon yarn (0.003" diameter fibers) as current collector and dried overnight at 37° C. PHBV polymer (1.5 g) was dissolved in chloroform (60 mL) at 60° C. and applied drop-wise until all polymer was forced into the scaffold. After drying overnight at 25° C., the polymer structure was immersed in DI water (3-4 changes of ~2 L over a period of 8 hours) to dissolve out the sucrose. This gave a polymer-carbon architecture of ~5.08×4.28×0.9 cm that was used as an anode electrode. The electrode was functionalized with methylene green and alcohol dehydrogenase using a procedure described in Rincón, R. A. Lau, C., Luckarift, H. R., Garcia, K. E., Adkins, E., Johnson, G. R., Atanassov, P. Biosensors and Bioelectronics 2011, 27, 132-136, incorporated by reference above.

In the presence of ethanol, the alcohol dehydrogenase-functionalized anode exhibits a steady open-circuit potential of −0.05 V (versus Ag/AgCl). The presented design of an anode electrode with immobilized alcohol dehydrogenase as biocatalyst for ethanol oxidation delivers a current density of ~0.02 mA cm3.

What is claimed is:

1. A method for forming a porous bioelectrode comprising:
   mixing a dissolvable granular material, a particulate conductive material, and a shaping agent to form a mixture;
   shaping the mixture and allowing the mixture to harden to form a composite material;
   exposing the hardened composite material to a biopolymer under suitable conditions to allow the biopolymer to intercalate the particulate material in the composite material to form a polymer composite; and
   removing the dissolvable granular material from the polymer composite to produce a porous biopolymer scaffold; and
   immobilizing a redox biocatalyst to the scaffold to form the bioelectrode.

2. The method of claim 1 wherein the granular material is water soluble.

3. The method of claim 1 wherein the granules in the granular material have a diameter of less than 600 μm.

4. The method of claim 1 wherein the granules in the granular material have a diameter of less than 360 μm.

5. The method of claim 1 wherein the granular material is sugar.

6. The method of claim 1 wherein the particulate conductive material is carbon-based.

7. The method of claim 6 wherein the carbon-based particulate conductive material is carbon fiber (CF).

8. The method of claim 6 wherein the carbon-based particulate conductive material is reticulated vitreous carbon (RVC).

9. The method of claim 6 wherein the carbon-based particulate conductive material is carbon nanotubes (CNT).

10. The method of claim 1 wherein the ratio of granular material to particulate structural material is between 100:1 (w/w/) and 1:1 (w/w).

11. The method of claim 1 wherein the step of shaping the mixture comprises packing the mixture into a mold.

12. The method of claim 2 wherein the removing the dissolvable granular material from the polymer composite comprises exposing the polymer composite to water.

13. The method of claim 1 wherein the redox biocatalyst is an exoelectrogen.

14. The method of claim 13 wherein the exoelectrogen is selected from the group consisting of *Shewanella* spp., *Geobacter* spp., *Rhodopseudomonas* spp., *Ochrobactrum* spp., *Enterobacter* spp., *Thiobacillus thiooxidans*, *Thiobacillus ferrooxidans*, *Acidiphilium cryptum*, *Acidiphilium multivorum*, *Acidiphilium symbioticum*, *Acidiphilium angustum*, *Acidocella aminolytica*, *Acidocella facilis*, *Sulfobacillus thermosulfidooxidans*, *Ferro-plasma acidarmanus*, *Metallosphaera sedula*, *Sulfolobus acidocaldarius*, *Sulfolobus solfataricus*, *Acidithiobacillus thiooxidans*, *Leptospirillum ferrooxidans*, *Escherichia coli*, *Shewanella oneidensis*, *Acidithiobacillus ferrooxidans*, *Pseudomonas* spp., and *Burkholderia* spp.

15. The method of claim 1 wherein the redox biocatalyst is a redox-active enzyme.

16. The method of claim 15 wherein the redox-active enzyme is selected from the group consisting of multicopper oxidases, dehydrogenases, glucose oxidase, and PQQ-dependent glucose dehydrogenase.

17. The method of claim 1 further comprising packing the mixture around a current conducting material.

18. The method of claim 1 further comprising determining a desired conductivity for the bioelectrode and selecting an amount of particulate conductive material to be used to form the scaffold in order to achieve the desired conductivity.

* * * * *